July 15, 1941.  T. M. KNOX  2,249,563

FEATHER DRYING MACHINE

Filed Aug. 3, 1939

INVENTOR:
Theodore M. Knox,
BY: Christian R. Nielsen
ATTORNEY.

Patented July 15, 1941

2,249,563

UNITED STATES PATENT OFFICE 2,249,563

FEATHER DRYING MACHINE

Theodore M. Knox, Chicago, Ill.

Application August 3, 1939, Serial No. 288,248

5 Claims. (Cl. 34—2)

This invention relates to feather drying machines, and it consists in the constructions, arrangements and combinations described and claimed.

It is the principal object of the invention to provide a machine for supplying heated air to the feathers during agitation. It is also an object of the invention to provide a novel construction of heater in which the inner container of the heater is suitably insulated and in which the lower portion of the heater housing is provided with a heating chamber from which heated air is withdrawn for discharge upon feathers during agitation.

It is a still further object of the invention to provide a heater of the character mentioned in which a novel arrangement of piping and dampers are provided whereby heated air may be circulated through the agitation chamber of the heater, or employed for conducting the dried feathers to the storage room.

Figure 1:
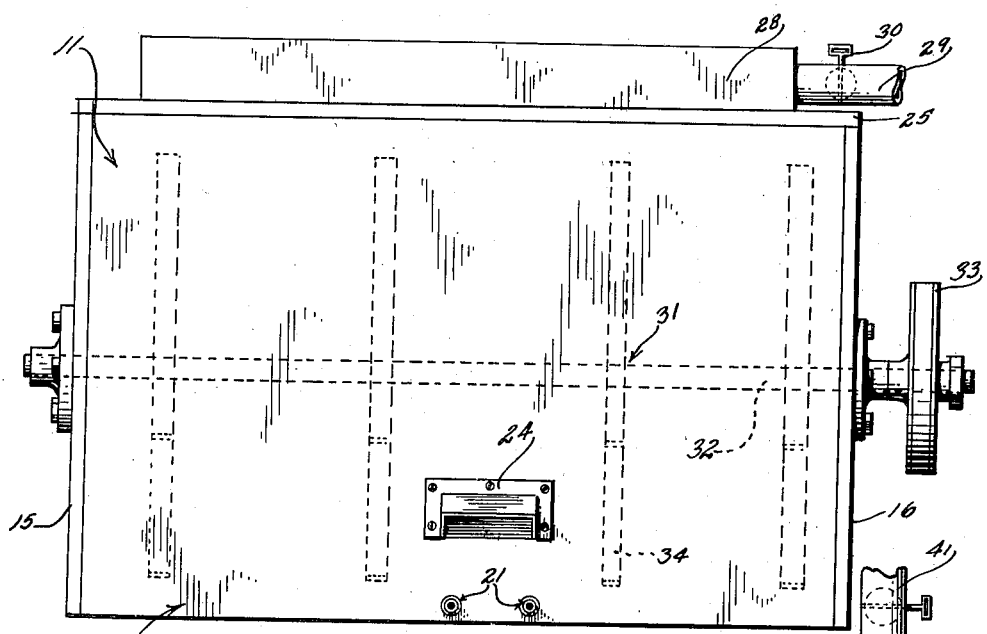

Additional objects, advantages and features of invention will be apparent from the following description considered in conjunction with the accompanying drawing, wherein Figure 1 is a side elevation of the drier constructed in accordance with the invention.

Figure 2:
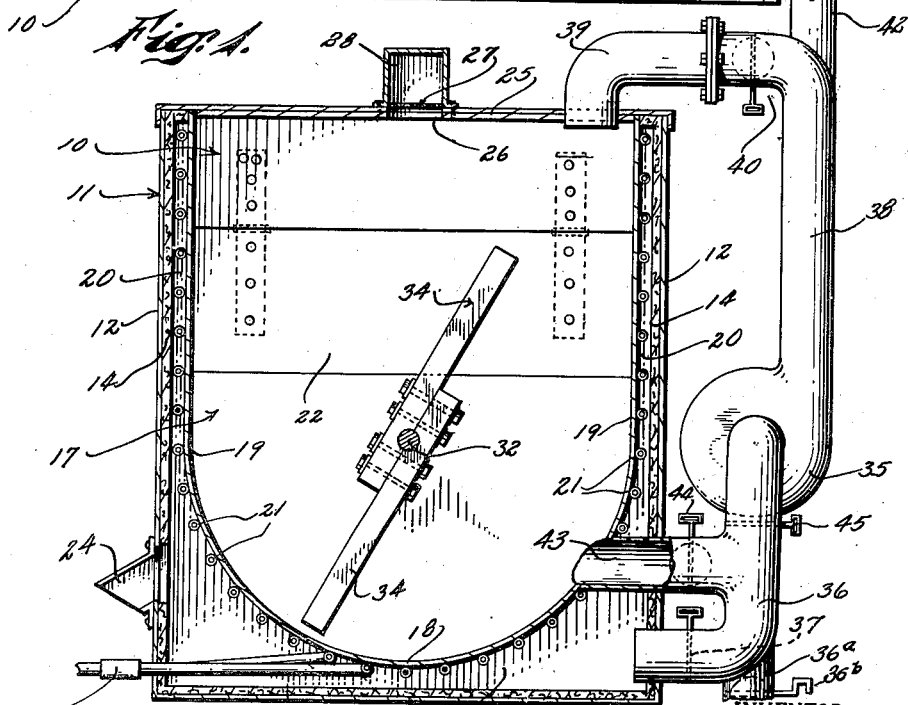

Figure 2 is a vertical cross section thereof.

There is illustrated a heater 10, which may be of any desired dimensions, this depending upon the capacity of the machine. The heater 10 comprises a rectangular housing 11 of proper gauge sheet iron, the side walls 12 and bottom wall 13 being lined with asbestos 14 for effectively maintaining the heat within the housing for a purpose as will presently appear. The housing includes end walls 15 and 16 which abut snugly against respective end edges of an inner receptacle 17 as will now be described.

The receptacle 17 is substantially U-shaped in cross section, the semi-circular bight 18 or bottom wall being spaced from the asbestos lined bottom wall 13, a suitable distance, and the side walls 19 are similarly spaced from the side walls 12. The receptacle 17 is preferably of copper.

The side walls 12 preferably are extended across horizontally and connected in any suitable manner to the upper edges of the receptacle 17. Thus, the heater is provided with a space 20 for reception and proper securement of steam pipes 21 as will be described.

The wall 15 includes a hingedly connected door 22 whereby feeding of feathers to the receptable may be accomplished, and this door may also be found useful in cleaning the receptacle 17. However, if desired, a hopper may replace the door, this being so well understood that illustration thereof is not believed necessary.

Within the spaces 20, the steam coils are mounted, the coils being arranged one above the other, between the walls 12 and 19 and around the bottom wall 18. The coils 21 entering through one of the walls 12 as clearly shown in Figure 2. It will thus be apparent that heat from the coils will be transmitted to the receptacle 17 to some extent, although the spaces 20 together with the space 23 beneath the bottom wall 18 provide a chamber for heating of air to be discharged into the receptacle, as will be presently explained, and for this purpose, a wall 12 has an air inlet 24 opening into the spaces 20 and 23.

The heater 10 is provided with a cover 25 which is provided with a medial longitudinally extended opening 26 over which there is secured a perforated screen 27. A housing 28 encloses the opening and the screen, one end of the housing having a duct 29 leading to a point exteriorly of a building in which the drier is installed. The duct has a damper 30 for a purpose as will presently appear.

Within the receptacle an agitator 31 is mounted, suitably journalled in the end walls 15 and 16, the shaft 32 of the agitator having a pulley or sprocket 33 for rotating the same. The agitator may be of any desired construction, but in the present instance is shown as embodying radially extended paddles 34.

A blower 35 is provided having an air inlet or suction duct 36 extended through the adjacent wall 12 into the space 23, the duct being controlled through a damper 37. A discharge duct 38 is also connected to the blower 35 extended upwardly and has an air discharge duct 39 opening into the receptacle 17 through the cover 25. A damper 40 is provided in the duct 39. The duct 38 includes an extension 41 controlled by a damper 42, the latter leading to a packing or storage room, not shown.

The air inlet 36 has a lateral duct 43 opening upon the chamber 23 and includes a damper 44, and the duct 36 also includes a damper 45 positioned between the blower and the lateral duct 43.

While I have described the machine as being filled through the door 22, it is readily possible to fill the heater with feathers by providing an extension 36a which may be connected to a blower (not shown) and a source of feathers. The extension 36a will include a damper 36b. Thus, by closing the dampers 37 and 45, the damper 44 being open, the feathers may be blown through duct 36a, 36, and 43, for discharge into the receptacle. After the required amount of feathers have been discharged into the receptacle, the damper 36b will be closed, the blower feeding the feathers is stopped and the dampers 37 and 45 are opened, and the machine is now in readiness for the drying operation, as will now be described.

The operation

The operation of the heater will be readily understood from the following description, it being assumed that the receptacle has been filled with clean, washed feathers and that live steam has been admitted into the coils 21, with consequent heating of air in the spaces 20 and 23, the air having been admitted through the inlet 24. The dampers 44 and 42 are closed.

The agitator is rotated to agitate the feathers, and the blower being in operation, heated air will be drawn from the space 23 by way of the duct 36 through the blower 35, the ducts 38 and 39 and discharge directly into the feathers during agitation. This operation is continued until the feathers become thoroughly dry and fluffy, which may be determined by inspection through the door 22.

Obviously, the drying of the feathers will create moisture, but this will be carried off through the vent 28 and duct 29, the duct leading to the outside of the building. The duct 29 will also carry off any dust which may develop during the drying operation.

When the feathers are dried and it is desired to remove the feathers from the receptacle, the dampers 37 and 40 are closed and the dampers 44 and 42 are opened, and of course, agitation of the feathers has ceased. The suction created by the blower is then by the way of the ducts 43, 38 and 41, the latter duct conducting the feathers to a packing or storage room.

The construction herein disclosed has been specifically described, but this is for the purpose of illustration only, and I consider as my own all such modifications in structure as fairly fall within the scope of the appended claims.

I claim:

1. A machine for drying feathers or the like comprising a housing, a receptacle within the housing spaced therefrom, a steam coil in the space between the housing and the receptacle, said housing having an air inlet in communication with the space defined by the housing and receptacle, an agitator revolubly mounted within the receptacle, a blower exteriorly of the housing, a damper-controlled duct leading from the suction side of the blower to the space defined by the receptacle and housing, a laterally extended damper-controlled duct opening upon the first named duct and the receptacle, said blower having a discharge duct opening into the receptacle at an upper part thereof, said last named duct having a damper for controlling passage of air therethrough, a damper-controlled extension on said discharge duct above the last named duct, and an air discharge vent in the housing.

2. The structure of claim 1 in which the suction duct comprises an extension duct to a source of feather supply.

3. A machine for drying feathers or the like comprising a housing, a receptacle within the housing spaced therefrom, said receptacle having a semi-circular bottom, a steam coil in the space between the housing and the receptacle, said coil lying adjacent the sides and bottom wall of the receptacle, said housing having an air inlet in communication with the space defined by the housing and receptacle, an agitator revolubly mounted within the receptacle, a blower exteriorly of the housing, a damper-controlled duct leading from the suction side of the blower to the space defined by the receptacle and housing, a laterally extended damper-controlled duct opening upon the first named duct and the receptacle, said blower having a discharge duct opening into the receptacle at an upper part thereof, said duct having a damper for control of air therethrough, a damper-controlled extension on said discharge duct above the last named duct and said receptacle having a vent and damper controlled duct for conducting moist air from the receptacle.

4. The structure of claim 3 in which the suction duct comprises an extension duct to a source of feather supply.

5. The structure of claim 3 in which the housing comprises a door providing communication with the receptacle.

THEODORE M. KNOX.